July 9, 1963
F. W. STADELMAN
3,096,998
TRACTION ATTACHMENT FOR TRACTORS
Filed Feb. 27, 1961
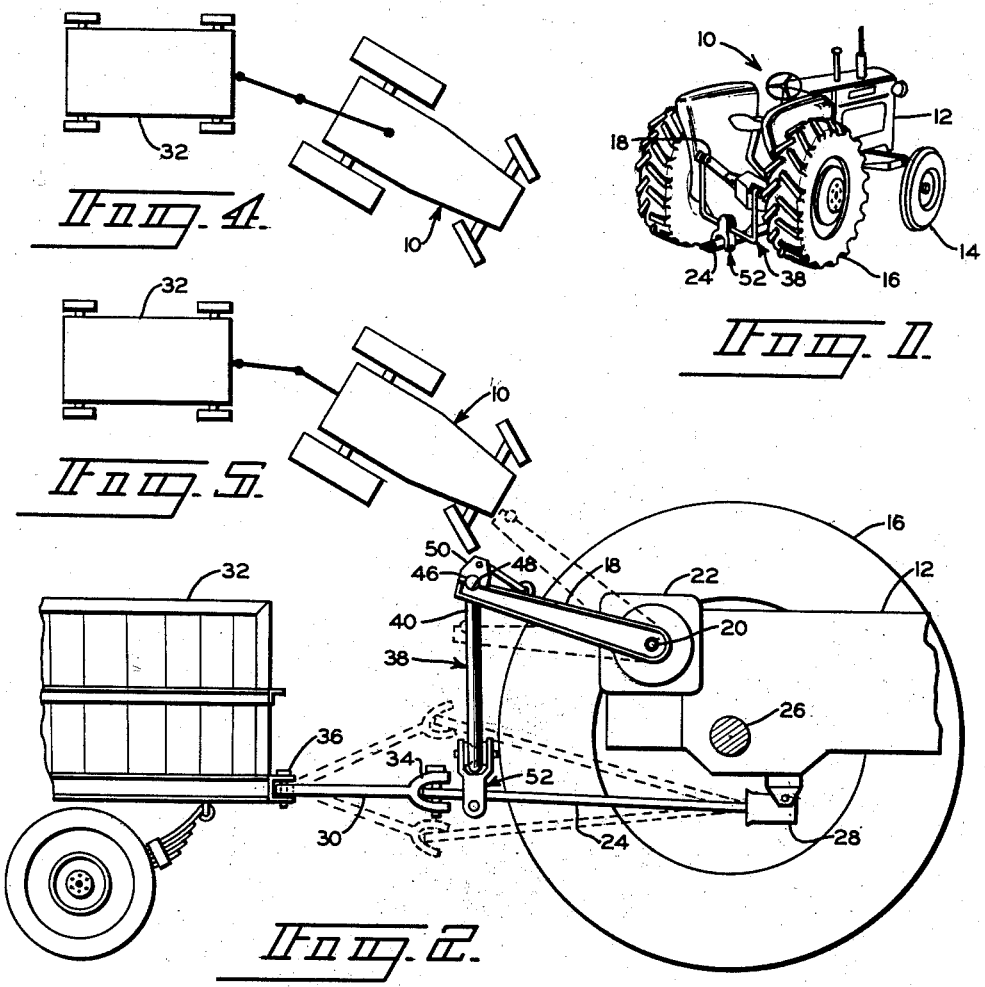
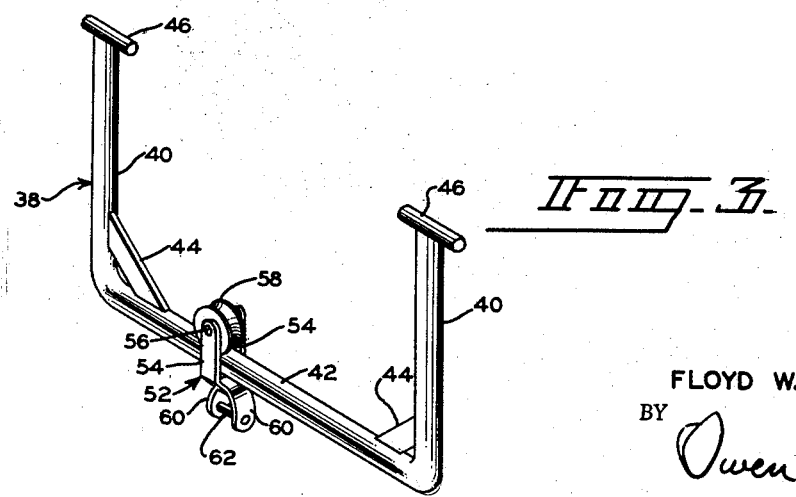
INVENTOR.
FLOYD W. STADELMAN
BY
Owen & Owen
ATTORNEYS United States Patent Office 3,096,998
Patented July 9, 1963

3,096,998
TRACTION ATTACHMENT FOR TRACTORS
Floyd W. Stadelman, 4387 S. Custer, Monroe, Mich.
Filed Feb. 27, 1961, Ser. No. 91,911
3 Claims. (Cl. 280—405)

This invention relates to a traction attachment for tractors and more particularly to an improved device for increasing traction of a tractor when additional traction is needed.

Tractors often require extra traction during pulling operations as when in mud or going up hill, for example. It has heretofore been recognized that traction can be increased by increasing downward force on the rear wheels so as to enable them to have increased frictional contact with the ground. This can be accomplished by raising a draw bar connecting the tractor and an attachment being pulled to bring about an increase in this downward force. For tractors employing lift arms, the draw bar can be raised by a special lift bar which cooperates with the draw bar to raise it and a tongue of the attachment when the lift arms are raised.

The present invention relates to an improved lift bar for a tractor incorporating lift arms, which bar has several important advantages over those heretofore known. The new lift bar does not require a special draw bar but, rather, cooperates with a standard draw bar to cause raising and lowering thereof. This eliminates the cost of an auxiliary draw bar and effects considerable savings in expense. In addition, a yoke of the new lift bar which cooperates with the draw bar also is horizontally movable on a portion of the lift bar to improve operation and manipulation of the tractor because the draw bar will be able to continue to pivot about its usual point of attachment to the tractor body rather than having restricted movement and extending substantially straight out behind the tractor, as will be discussed more fully subsequently.

It is, therefore, a principal object of the invention to provide an improved lift bar for a tractor, by means of which bar increased traction of the rear wheels can be obtained.

Another object of the invention is to provide a lift bar for a tractor, which bar can be used with a standard draw bar.

Still another object of the invention is to provide an improved lift bar for a tractor, which bar has a movable connection to a draw bar to enable the draw bar to pivot at a standard connecting point on the tractor body and thereby facilitate operation and manipulation of the tractor.

Other objects and advantages of the invention will be apparent from the following detailed description of a preferred embodiment thereof, reference being made to the accompanying drawings, in which:

FIG. 1 is an overall, rear view in perspective of a tractor embodying a lift bar according to the invention;

FIG. 2 is an enlarged, fragmentary, somewhat schematic side view in elevation of the tractor of FIG. 1, with a rear wheel thereof removed, and with an attachment connected to a draw bar of the tractor;

FIG. 3 is a view in perspective of the lift bar shown in FIGS. 1 and 2;

FIG. 4 is a schematic plan view of the tractor and attachment of FIG. 2, with the tractor partially turned; and FIG. 5 is a schematic plan view similar to FIG. 4 but of a tractor and attachment using a conventional lift bar.

Referring to the drawing, and more particularly to FIG. 1, a tractor 10 includes a body 12, front wheels 14, rear wheels 16, and lift arms 18 (see FIG. 2 also) which are affixed to a shaft 20 extending through a drive housing 22. The drive housing 22 is powered by the tractor motor and rotates the shaft 20 to cause the arms to move in an arcuate path. The lift arms 18 usually are employed with a plow attachment to enable the plow to be suspended above the ground or extended below the surface of the ground, as desired.

The tractor 10 also includes a standard draw bar 24 which is preferably attached to the underside of the body 12 between a rear axle 26 of the rear wheels 16 and the front wheels 14. The attachment is made by means of a bell-shaped connector 28 which enables the draw bar 24 to move both horizontally and vertically. The draw bar 24 is connected to a standard tongue member 30 of an attachment, such as a wagon 32 of FIG. 2, as is known in the art. The tongue member 30 is connected to the draw bar 24 by a suitable pivotal connection 34 for both horizontal and vertical movement and the tongue member 30 can also be pivotally connected at 36 to the wagon 32. The tractor and the attachment described to this point are known in the art and are commercially available.

In accordance with the invention, a lift bar 38 is connected to free ends of the lift arms 18 and to the draw bar 24, between the pivotal attachment 28 to the body 12 and the pivotal attachment 34 to the tongue member 30. The lift bar 38 constitutes a generally U-shaped member having upright legs 40 rigidly attached to a horizontal cross leg or member 42 with corner braces 44 preferably welded in position for added strength and stiffness. The upper ends of the upright legs 40 have pivot rods 46 affixed thereto, as by welds for example, which rods are positioned in notches 48 of the arms 18 and held therein by suitable clamps 50 which can be removed or swung out of the way to enable the lift bar 38 to be separated from the arms 18. The free ends of the arms 18 are preferably bifurcated with the upright bars 40 extending between these end portions and with the rods 46 positioned in the notches 48 on each side of each of the upright legs 40. However, it is to be understood that the pivot rods 46 can also extend in only one direction from the upright legs 40 to form an L-shaped configuration with the upright legs and be mounted on the free ends of the arms 18 from one side thereof. The pivotal mounting of the lift bar 38 on the lift arms 18 enables the lift bar 38 to remain in a generally vertical position as the lift arms 18 are rotated so that the lift bar 38 will contact the draw bar 24 in generally the same portion for all positions of the arms 18.

On the horizontal leg 42 of the lift bar 38 is a yoke connection 52 for supporting the draw bar 24 from the horizontal leg 42. The yoke connection 52 includes a pair of upper arms 54 which extend upwardly on each side of the horizontal leg 42 and are pivotally attached by an axle 56 to a roller 58 which rides on the top of the horizontal leg 52. The yoke connection 52 also includes a pair of lower, depending arms 60 which extend downwardly on each side of the draw bar 24, with lower ends of the arms 60 carrying a supporting rod 62 which is located below the draw bar 24. The supporting rod 62 preferably can be removed from the depending arms 60 so that the yoke connection 52 can be more easily assembled with and separated from the draw bar 24.

When the lift bar 38 is assembled with the lift arms 18 and the draw bar 24, it will be readily understood that the draw bar 24 moves in an arcuate path around its pivotal attachment 28 when the lift arms 18 are raised and lowered. While under normal operation, the lift arms 18 will be positioned as shown in FIG. 2 to keep the draw bar 24 generally horizontal, the lift arms 18 can be raised and lowered to raise and lower the draw bar 24. The maximum upper and lower portions of the lift arms 18, the lift bar 38, the draw bar 24, and the tongue 30 are shown in dotted lines in FIG. 2.

When the tractor 10 is pulling an attachment such as the attachment 32, and additional traction is needed, the operator simply rotates the arms 18 upwardly by means of the mechanism 20 and causes the draw bar 24 and the tongue 30 to assume an upward angular position, such as is shown by the upper dotted lines in FIG. 2. With the draw bar 24 and the tongue 30 in an upper position, as the tractor 10 pulls the attachment 32 the draw bar and tongue will be placed in tension and will tend to move toward a horizontal position. Of course, the lift bar 38 and the lift arms 18 prevent the draw bar and tongue from so moving by establishing an upwardly directed reactive force preventing such movement. This reactive force tends to pull the rear of the tractor 10 downwardly by establishing a counterclockwise torque on the tractor in FIG. 2 through the lift arms 18, and thereby increase the downward force on the rear wheels 16 of the tractor. This increased force on the rear wheels 16 increases traction and thereby increases the pulling power of the tractor.

It will be seen that the force on the rear wheels 16 can be reduced to less than normal by moving the lift arms 18 downwardly so that the draw bar 24 and the tongue 30 will assume a position below the horizontal, such as is shown in the lower dotted lines of FIG. 2. In such a case, the lift arms 18 will be urged upwardly by means of the lift bar 38 and will thereby place a clockwise torque on the tractor and decrease the downward force on the rear wheels 16.

If the tongue 30 of the attachment 32 is rigid with respect to the attachment rather than being pivoted at the pivot 36, as shown in FIG. 2, then an upward movement of the lift arms 18 and the draw bar 24 will actually raise the front portion of the attachment 32 and will transfer part of the weight thereof to the tractor 10 and particularly to the rear wheels 16 thereof. Hence, the lift arms 18 will be effective with an attachment using either a pivoted tongue member or a rigid one.

The fact that the yoke connection 52 can move along the horizontal cross leg 42 of the lift bar 38 enables the tractor 10 to be manipulated more easily during turning. Thus, when the tractor 10 is turned when pulling the attachment 32, the draw bar 24 and the tongue 30 will remain in a straight line, as schematically illustrated in FIG. 4, with the yoke connection 52 moving closer to one of the upright legs 40, the right-hand one as illustrated in FIGS. 3 and 4. This enables the force on the tongue 30 and the draw bar 24 to be transmitted directly to the body 12 at the attachment 28 where the draw bar 24 is pivotally connected to the body, this point preferably being between the front and rear wheels, or at least not behind the rear wheels. As will be seen in FIG. 4, this arrangement reduces resistance to turning due to the drag of the attachment to a minimum and may actually help to turn the tractor body.

In contrast, with lift bars heretofore known, the draw bar remains substantially parallel to the tractor body in all instances, with all pivotal movement between the tractor and the attachment being taken up in the pivotal connection between the draw bar and the tongue. With this arrangement, as shown in FIG. 5, the force on the tongue due to the drag of the attachment is transmitted to the body rearwardly of the rear wheels and establishes much greater resistance to the turning of the tractor.

Besides having the above operational advantages, the new lift bar 38, by employing the standard draw bar 24, eliminates the additional cost of an auxiliary draw bar. The lift bar also is inexpensive to make, the legs 40 and the cross leg 42 being formed from a single piece of steel, 1¼" diameter steel rod being found suitable for this purpose. After the legs 40 and 42 are formed, only the braces 44 and the pivot rods 46 need be welded in place and the yoke connection 52 then mounted on the cross leg 42.

Various modifications of the above described embodiment of the invention will be apparent to those skilled in the art and it is to be understood that such modifications can be made without departing from the scope of the invention, if within the spirit and tenor of the accompanying claims.

I claim:

1. For a tractor having a body, rear wheels, front wheels, a draw bar extending rearwardly from said body, means pivotally connecting said draw bar to said body, a pair of lift arms extending rearwardly of and supported by said tractor body, and means connected to said arms for moving them in an arcuate path, the improvement comprising a generally U-shaped member comprising a pair of upright legs and a straight, rigid, horizontal cross member functionally integral therewith, means at upper ends of said legs to provide a pivotal attachment to said lift arms, and a yoke movably supported on said cross member for travel longitudinally thereof and slidably connected to said draw bar.

2. For a tractor having a body, rear wheels, front wheels, a draw bar extending rearwardly from said body, means pivotally connecting said draw bar to said body, a pair of lift arms extending rearwardly of and supported by said tractor body, and means connected to said arms for moving them in an arcuate path, the improvement comprising a generally U-shaped member comprising a pair of upright legs and a straight, horizontal cross member, means at upper ends of said legs to provide a pivotal attachment to said lift arms for movement only in a plane parallel to the plane of movement of said arms, a yoke having a pair of depending arms movably connected to said draw bar for supporting said draw bar and a pair of upwardly extending arms extending on each side of said cross member, and means held by said arms for movably supporting said yoke on said cross member.

3. For a tractor having a body, rear wheels, front wheels, a draw bar extending rearwardly from said body, means pivotally connecting said draw bar to said body, a pair of lift arms extending rearwardly of and pivotally connected to said tractor body, and means connected to said arms for moving them in an arcuate path, the improvement comprising a rigid, generally U-shaped member comprising a pair of upright legs and a straight, horizontal cross member attached to the lower ends thereof, means at upper ends of said legs to provide a pivotal attachment of said legs to said lift arms whereby said arms remain in generally upright positions for any position of said lift arms, a yoke comprising a pair of depending arms extending downwardly on each side of said draw bar, a pair of upwardly extending arms on each side of said cross member, means held by said depending arms for movably supporting said draw bar whereby said yoke can move in a direction having a component directed longitudinally of said draw bar, a roller rotatably held by said upwardly extending arms above said cross member for contacting said cross member and movably supporting said yoke and said draw bar whereby said yoke can move in a lineal path parallel to said cross member and said draw bar can move in an arcuate path, the center of which constitutes the point of the pivotal connection of said draw bar to said body.

References Cited in the file of this patent

UNITED STATES PATENTS

| | | |
|---|---|---|
| 2,898,126 | Loukonen | Aug. 4, 1959 |
| 2,919,754 | Walberg | Jan. 5, 1960 |
| 2,930,630 | Tanke | Mar. 29, 1960 |